US009619769B2

(12) United States Patent
Ploesser et al.

(10) Patent No.: US 9,619,769 B2
(45) Date of Patent: Apr. 11, 2017

(54) OPERATIONAL LEADING INDICATOR (OLI) MANAGEMENT USING IN-MEMORY DATABASE

(71) Applicants: Karsten Ploesser, Bulimba (DE);
Piyush Chandra, San Mateo, CA (US);
Keith Gill, Chipping Campden (GB);
Farah Jama, Westerville, OH (US)

(72) Inventors: Karsten Ploesser, Bulimba (DE);
Piyush Chandra, San Mateo, CA (US);
Keith Gill, Chipping Campden (GB);
Farah Jama, Westerville, OH (US)

(73) Assignee: SAP SE, Walldorf (DE)

( * ) Notice: Subject to any disclaimer, the term of this patent is extended or adjusted under 35 U.S.C. 154(b) by 438 days.

(21) Appl. No.: 14/242,074

(22) Filed: Apr. 1, 2014

(65) Prior Publication Data

US 2015/0278738 A1 Oct. 1, 2015

(51) Int. Cl.
*G06Q 10/00* (2012.01)
*G06F 17/30* (2006.01)
(Continued)

(52) U.S. Cl.
CPC . *G06Q 10/06315* (2013.01); *G06F 17/30587* (2013.01); *G06Q 10/04* (2013.01)

(58) Field of Classification Search
CPC .... G06Q 10/0639; G06Q 40/00; G06Q 10/00; G06Q 10/06; G06F 17/30592; G06F 17/30867
(Continued)

(56) References Cited

U.S. PATENT DOCUMENTS 5,757,664 A 5/1998 Rogers et al.
6,564,191 B1 5/2003 Reddy
(Continued)

FOREIGN PATENT DOCUMENTS

CA 2201275 A1 * 9/1998 ............. G06F 9/526
SE WO 9858330 A2 * 12/1998 ............... G06F 9/52

OTHER PUBLICATIONS

Podgórski, Daniel. "Measuring operational performance of OSH management system—A demonstration of AHP-based selection of leading key performance indicators." Safety Science 73 (2015): 146-166.*

(Continued)

*Primary Examiner* — Matthew Gart
*Assistant Examiner* — Derick Holzmacher
(74) *Attorney, Agent, or Firm* — Fountainhead Law Group P.C.

(57) ABSTRACT

Embodiments leverage capabilities of an in-memory database to manage measurement and modeling of Operational Leading Indicators (OLIs). An OLI template may comprise four model components: ratio calculation; factor calculation; predictive modeling; and cost estimation. Each model component is motivated and explained in terms of information sources, and analytical or statistical modelling tasks used in its definition. Embodiments combine analytical and statistical modelling utilizing in-memory computing, to process large amounts of unmodified source data, calculate cost measures rapidly without preaggregation, and/or run linear regression models on the same data set and in the same memory space without a need for separate hardware. An engine in communication with the in-memory database that comprises a large volume of available data, is configured to receive values for OLI factors as inputs. In response, the engine is configured to process these inputs according to the (Continued)

modeling template to provide corresponding cost measures as outputs.

17 Claims, 9 Drawing Sheets

(51) Int. Cl.
*G06Q 10/06* (2012.01)
*G06Q 10/04* (2012.01)

(58) Field of Classification Search
USPC .............. 705/7.11, 35, 28; 707/602; 370/231
See application file for complete search history.

(56) References Cited

U.S. PATENT DOCUMENTS

| | | | | |
|---|---|---|---|---|
| 7,392,248 | B2* | 6/2008 | Bakalash ........... | C03B 37/02718 |
| 7,493,235 | B2* | 2/2009 | Artman ................. | G06Q 10/06 |
| | | | | 702/182 |
| 7,526,508 | B2* | 4/2009 | Tan .................... | G06F 17/30289 |
| 7,590,639 | B1* | 9/2009 | Ivanova ............. | G06F 17/30377 |
| 7,720,842 | B2* | 5/2010 | Shringeri ............ | G06F 17/30398 |
| | | | | 707/722 |
| 7,814,080 | B1* | 10/2010 | Luo .................... | G06F 17/30463 |
| | | | | 707/687 |
| 7,945,472 | B2* | 5/2011 | Pappas ................. | G06Q 10/06 |
| | | | | 705/7.31 |
| 8,032,448 | B2* | 10/2011 | Anderson ............. | G06Q 20/10 |
| | | | | 705/38 |
| 8,112,305 | B2 | 2/2012 | Shimizu | |
| 8,234,155 | B2 | 7/2012 | Malov et al. | |
| 8,311,863 | B1* | 11/2012 | Kemp ................. | G06Q 10/0639 |
| | | | | 705/7.11 |
| 8,352,407 | B2 | 1/2013 | Salle et al. | |
| 8,370,280 | B1 | 2/2013 | Lin et al. | |
| 8,577,791 | B2 | 11/2013 | Malov et al. | |
| 8,635,147 | B2 | 1/2014 | Borkovec et al. | |
| 8,738,425 | B1* | 5/2014 | Basu ................. | G06Q 10/06393 |
| | | | | 705/7.38 |
| 8,799,209 | B2* | 8/2014 | Bakalash ........... | G06F 17/30489 |
| | | | | 707/603 |
| 2002/0087587 | A1* | 7/2002 | Vos .................... | G06F 17/30306 |
| 2002/0099563 | A1* | 7/2002 | Adendorff .......... | G06F 17/30563 |
| | | | | 705/7.11 |
| 2002/0099598 | A1* | 7/2002 | Eicher, Jr. ............. | G06Q 10/06 |
| | | | | 705/28 |
| 2003/0187523 | A1* | 10/2003 | Smith .................... | G06Q 30/00 |
| | | | | 700/83 |
| 2005/0071266 | A1* | 3/2005 | Eder ..................... | G06Q 40/00 |
| | | | | 705/38 |
| 2005/0086263 | A1* | 4/2005 | Ngai ................. | G06F 17/30306 |
| 2005/0240577 | A1* | 10/2005 | Larson .............. | G06F 17/30454 |
| 2005/0254424 | A1* | 11/2005 | Naono ................. | G06Q 10/00 |
| | | | | 370/231 |
| 2006/0101017 | A1* | 5/2006 | Eder ................. | G06F 17/30867 |
| 2007/0083412 | A1* | 4/2007 | Sternaman ............ | G06Q 40/00 |
| | | | | 705/35 |
| 2007/0112607 | A1 | 5/2007 | Tien et al. | |
| 2007/0233644 | A1* | 10/2007 | Bakalash .......... | G06F 17/30457 |
| 2008/0109270 | A1* | 5/2008 | Shepherd ............... | G06Q 10/06 |
| | | | | 705/7.26 |
| 2008/0184231 | A1 | 7/2008 | Dreiling | |
| 2008/0201397 | A1* | 8/2008 | Peng .................. | G06Q 10/00 |
| | | | | 708/308 |
| 2009/0105981 | A1 | 4/2009 | Gozzi | |
| 2009/0192841 | A1* | 7/2009 | Johnson ................ | G06Q 10/06 |
| | | | | 705/7.28 |
| 2010/0082292 | A1 | 4/2010 | Pantaleano et al. | |
| 2011/0270647 | A1* | 11/2011 | Huang ................... | G06Q 40/08 |
| | | | | 705/7.28 |
| 2013/0262174 | A1 | 10/2013 | Singh et al. | |
| 2014/0074819 | A1* | 3/2014 | Idicula ............. | G06F 17/30289 |
| | | | | 707/719 |
| 2014/0101177 | A1* | 4/2014 | Saito ................ | G06F 17/30303 |
| | | | | 707/755 |
| 2014/0142737 | A1 | 5/2014 | Tanna et al. | |
| 2014/0257545 | A1 | 9/2014 | Tanna et al. | |
| 2015/0006341 | A1* | 1/2015 | Egenolf ................. | G06Q 20/14 |
| | | | | 705/34 |
| 2015/0120642 | A1* | 4/2015 | Spielberg .......... | G06F 17/30592 |
| | | | | 707/602 |
| 2016/0321588 | A1* | 11/2016 | Das ................. | G06Q 10/06315 |

OTHER PUBLICATIONS

Miles Ewing et al., "Savvy Managers Look to the Future—Not just the Past—to get the Perspective they Need to Influence Future Performance," Deloitte Development LLC, 2008.

* cited by examiner

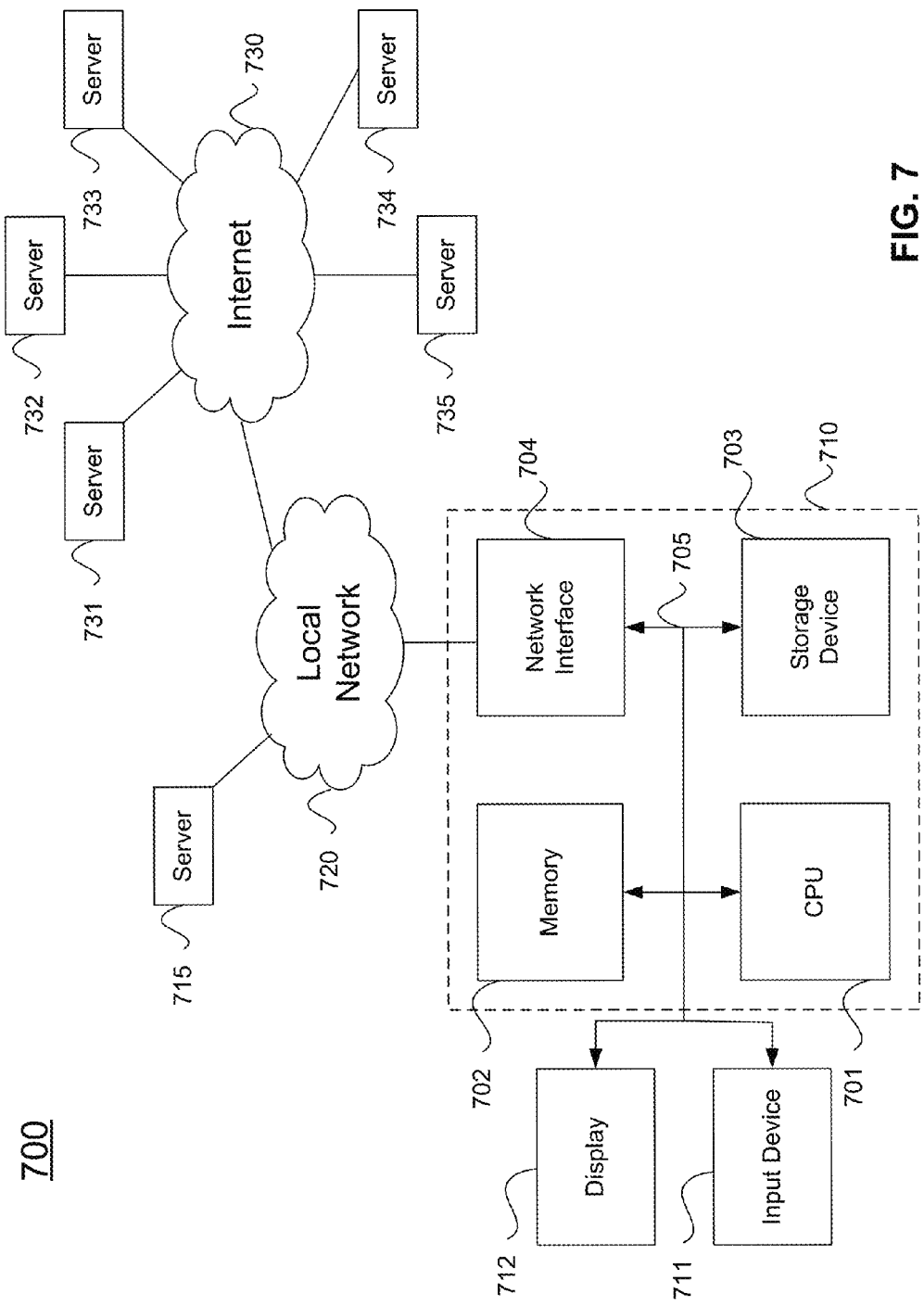

OPERATIONAL LEADING INDICATOR (OLI) MANAGEMENT USING IN-MEMORY DATABASE

BACKGROUND

Embodiments of the present invention relate to performance analysis, and in particular to systems and methods configured to manage Operational Leading Indicators (OLIs).

Unless otherwise indicated herein, the approaches described in this section are not prior art to the claims in this application and are not admitted to be prior art by inclusion in this section.

Traditionally, businesses measure performance as cost (i.e., an output of operational processes). While this approach provides an adequate picture of historic performance of a business unit over a defined period of time, cost as output measure gives little insight into future performance or root causes of process variance.

By contrast, Operational Leading Indicators (OLIs) are forward-looking measures of performance that complement traditional cost-based views of business performance. OLIs provide line managers with insight into the state of operations. OLIs can also explain business performance in terms of concrete operational factors.

OLIs remedy the shortcomings of cost-based metrics by focusing on identifying, selecting, defining, and implementing data that gives insight into future cost impact before it becomes apparent in the cost view. In particular, OLIs are indicators of operational efficiency and complement traditional (e.g., financial) views of performance.

Thus while financial metrics such as Return on Equity (RoE) have long been used to measure business performance, OLIs complement financial views of business performance by highlighting areas of operational inefficiency. This can prompt process redesign before issues become apparent in finance (a lagging indicator).

While the concept of OLI has been studied and discussed at length, little guidance exists on how OLIs can be realized in the information systems of a business entity. Conventional attempts at manual data collection and lack of predictive insight can lead to OLI projects and initiatives that are incomplete and/or do not return the investment made.

Accordingly, the present disclosure addresses these and other issues with systems and methods configured to manage OLIs.

SUMMARY

Embodiments leverage capabilities of an in-memory database to manage measurement and modeling of OLIs. An OLI template may comprise four model components: ratio calculation; factor calculation; predictive modeling; and cost estimation. Each model component is motivated and explained in terms of information sources, and analytical or statistical modelling tasks used in its definition. Embodiments combine analytical and statistical modelling utilizing in-memory computing, to process large amounts of unmodified source data, and calculate cost measures rapidly without preaggregation, and/or to run linear regression models on the same data set and in the same memory space without a need for separate hardware. An engine in communication with the in-memory database that comprises a large volume of available data, is configured to receive values for OLI factors as inputs. In response, the engine is configured to process these inputs according to the modeling template to provide corresponding cost measures as outputs.

An embodiment of a computer-implemented method comprises storing in an in-memory database, performance data of a process. Also stored in the in-memory database, is a model of an operational leading indicator (OLI) of the process. An engine is in communication with the model to receive inputs for performance values and performance measures. The engine is caused to process an output of statistical analysis of the model in order to produce a cost measure.

An embodiment of a non-transitory computer readable storage medium embodies a computer program for performing a method. The method comprises storing in an in-memory database, performance data of a process. Also stored in the in-memory database, is a model of an operational leading indicator (OLI) of the process. An engine is in communication with the model to receive inputs for performance values and performance measures. The engine is caused to process an output of statistical analysis of the model in order to produce a cost measure.

An embodiment of a computer system comprises one or more processors and a software program executable on said computer system. The software program is configured to store in an in-memory database, performance data of a process. The software program is also configured to store in the in-memory database, a model of an operational leading indicator (OLI) of the process. An in-memory database engine is in communication with the model to receive inputs for performance values and performance measures. The engine is caused to process an output of statistical analysis of the model in order to produce a cost measure.

In some embodiments the engine conducts predictive modeling correlating a measure of process inefficiency with the performance data to predict the cost measure.

According to certain embodiments the engine further conducts operational modeling identifying variables affecting the process.

Particular embodiments may further comprise extracting the performance data to the in-memory database without preaggregation.

Various embodiments may further comprise causing the engine to perform a what-if simulation based upon a new value for performance factors specified by a user.

Some embodiments may further comprise causing the engine to merge the model of the OLI with a model of a related OLI in order to create a composite index.

According to particular embodiments the statistical analysis comprises linear regression.

The following detailed description and accompanying drawings provide a better understanding of the nature and advantages of particular embodiments.

BRIEF DESCRIPTION OF THE DRAWINGS

FIG. 7 illustrates an example of a computer system.

DETAILED DESCRIPTION

Figure 1:
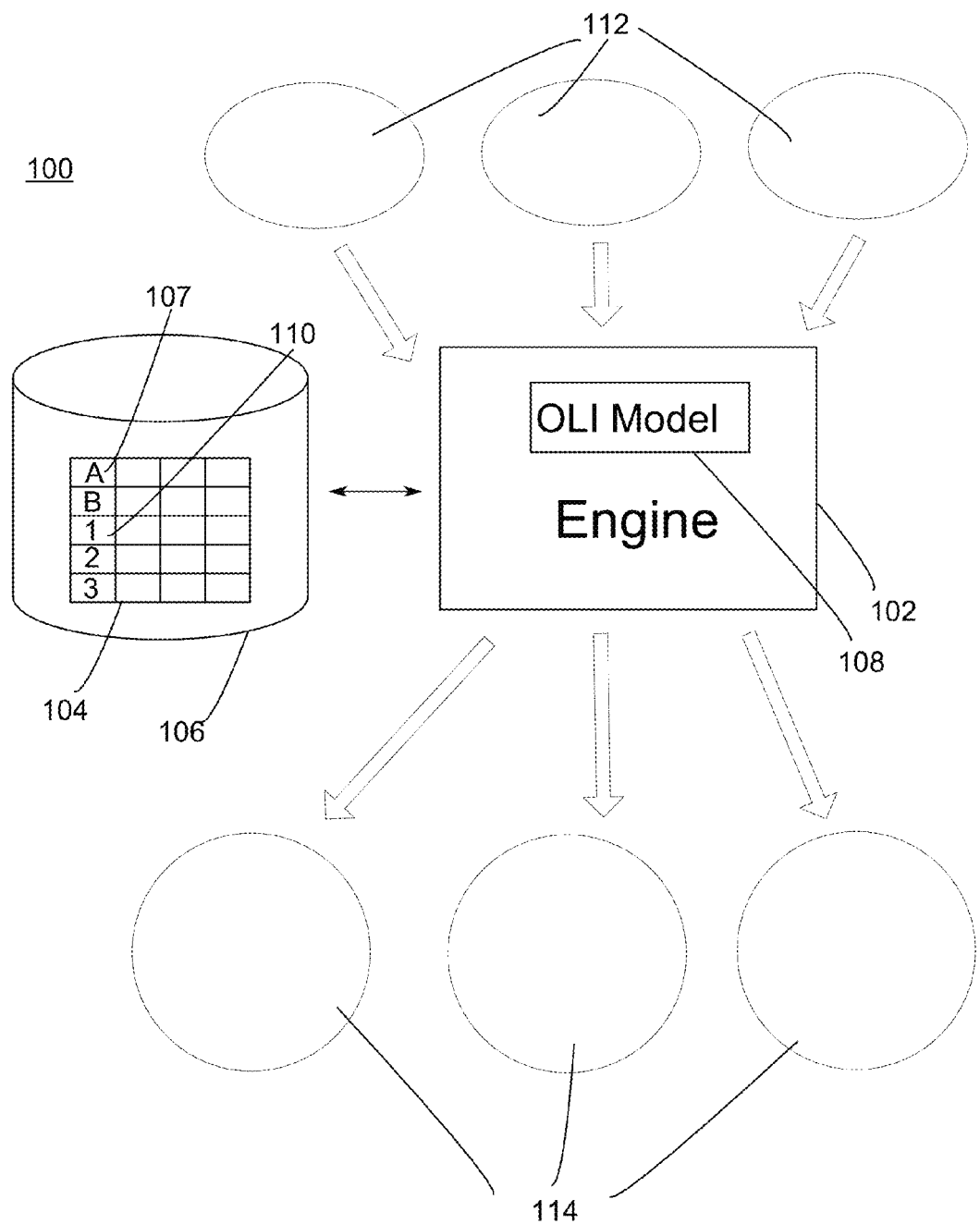
FIG. 1 shows a simplified view of an embodiment of an OLI management system.

Described herein are techniques implementing OLI modeling. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

By way of introduction, it is noted that operational performance can be defined using operational indicators. Operational indicators can be used to measure the efficiency of underlying processes. These measures can then be compared against internal and/or industry benchmarks.

OLIs are essentially those operational indicators that are forward looking rather than backward looking (lagging). Rather than offering a pure number, OLIs are closely tied to underlying processes and are thus capable of indicating future requirements attributable to changes in preceding processes.

For example, one possible OLI measures a number of duplicate invoices generated in a finance environment. An increase in this OLI (i.e., that a number of duplicate invoices is rising) would eventually result in higher operational costs (e.g. more full time employees required to correct the invoices, lost interest, and others as detailed below).

Independent variables are mutually exclusive and independent factors upon which the OLIs depend. For example, the number of posted manual invoices posted could constitute one independent variable for the OLI of duplicate invoices.

Cost drivers are costs associated with the OLIs. For the duplicate invoice OLI, cost driver examples could include loss of interest, cost of full time employee (FTE) for invoice correction, etc.

Essentially, the independent variables define the OLIs. The OLIs determine the costs associated with the process the OLI is used for.

In a what-if analysis, the user can change the independent variables to determine how the OLIs improve or deteriorate because of the change. This also allows a user to visualize the impact of the associated costs.

As described herein, particular embodiments leverage capabilities of an in-memory database to manage the measurement and modeling of OLIs. An OLI template may comprise four model components: ratio calculation; factor calculation; cost estimation; and predictive modeling. Each model component is motivated and explained in terms of information sources, and analytical or statistical modelling tasks used in its definition. Embodiments combine analytical and statistical modelling utilizing in-memory computing, to process large amounts of unmodified source data, and calculate cost measures rapidly without preaggregation, and/or to run linear regression models on the same data set and in the same memory space without a need for separate hardware. An engine in communication with the in-memory database that comprises a large volume of available data, is configured to receive values for OLI factors as inputs. In response, the engine is configured to process the inputs according to the modeling template to provide corresponding cost measures as outputs.

FIG. 1 shows a highly simplified view of a system 100 according to one embodiment. Here, engine 102 is in communication with a database 104 stored in a non-transitory computer readable storage medium 106. Stored in the database are factors 107 (e.g. A, B) of an OLI model 108 of a process. Also stored in the database is performance data 110 (e.g. 1-3) for that process.

Engine 102 is configured to receive as inputs, values for multivariate linear regression factors 112 of the model 108 of the OLI. The values of those factors can be changed by a user. Based upon these inputs, the engine is configured to perform what-if simulations on the modeled OLI to determine an effect of the changes in the regression factors upon end costs 114.

Figure 1A:
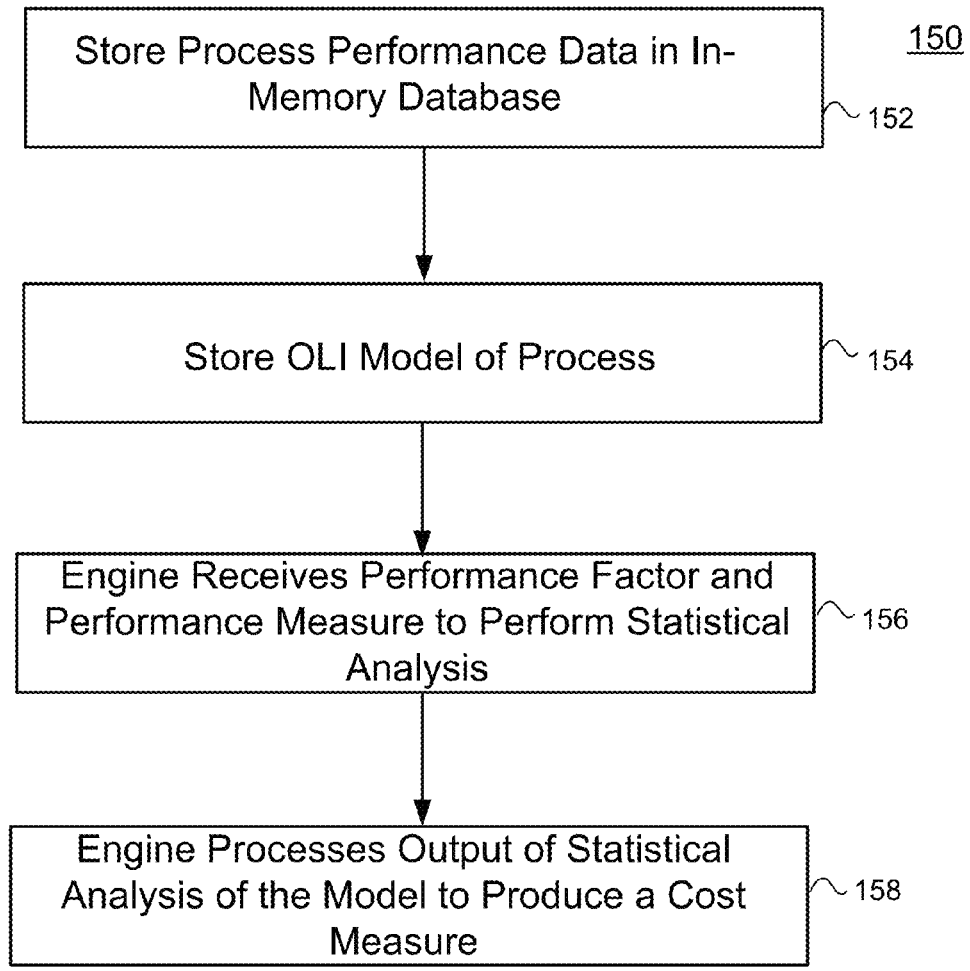
FIG. 1A is a simplified flow diagram illustrating a method according to an embodiment.

FIG. 1A is a simplified flow diagram illustrating a method 150 according to an embodiment. In a first step 152, performance data of a process is stored in an in-memory database. In a second step 154, a model of an operational leading indicator (OLI) of the process is stored in the in-memory database.

In a third step 156, an engine in communication with the model is caused to receive values for performance factors and performance measures as an input to perform a statistical analysis of their correlation. A performance factor comprises a measure of a process (e.g., number of manual invoices, number of invoices without a purchase order). A performance measure comprises a measure of a process output (e.g., number of duplicate invoices).

In a fourth step 158, the engine is caused to process the outcome of statistical analysis of the model in order to produce a cost measure identifying a cost driver. A cost driver comprises the unit cost associated with a process (e.g., cost associated with duplicate invoices).

Approaches to OLI modeling according to embodiments, may introduce four activities facilitated by the properties of an in-memory database. First, OLI selection may follow well-defined criteria to ensure OLIs can be measured based upon available data of sufficient quality.

Second, OLIs are to be made operational based upon: a) transactional data, and b) calculation methods converting the values of data points into scores. Third, predictive analytics and "what-if simulation" of cost drivers can be used to determine the expected impact of corrective actions.

Figure 4:
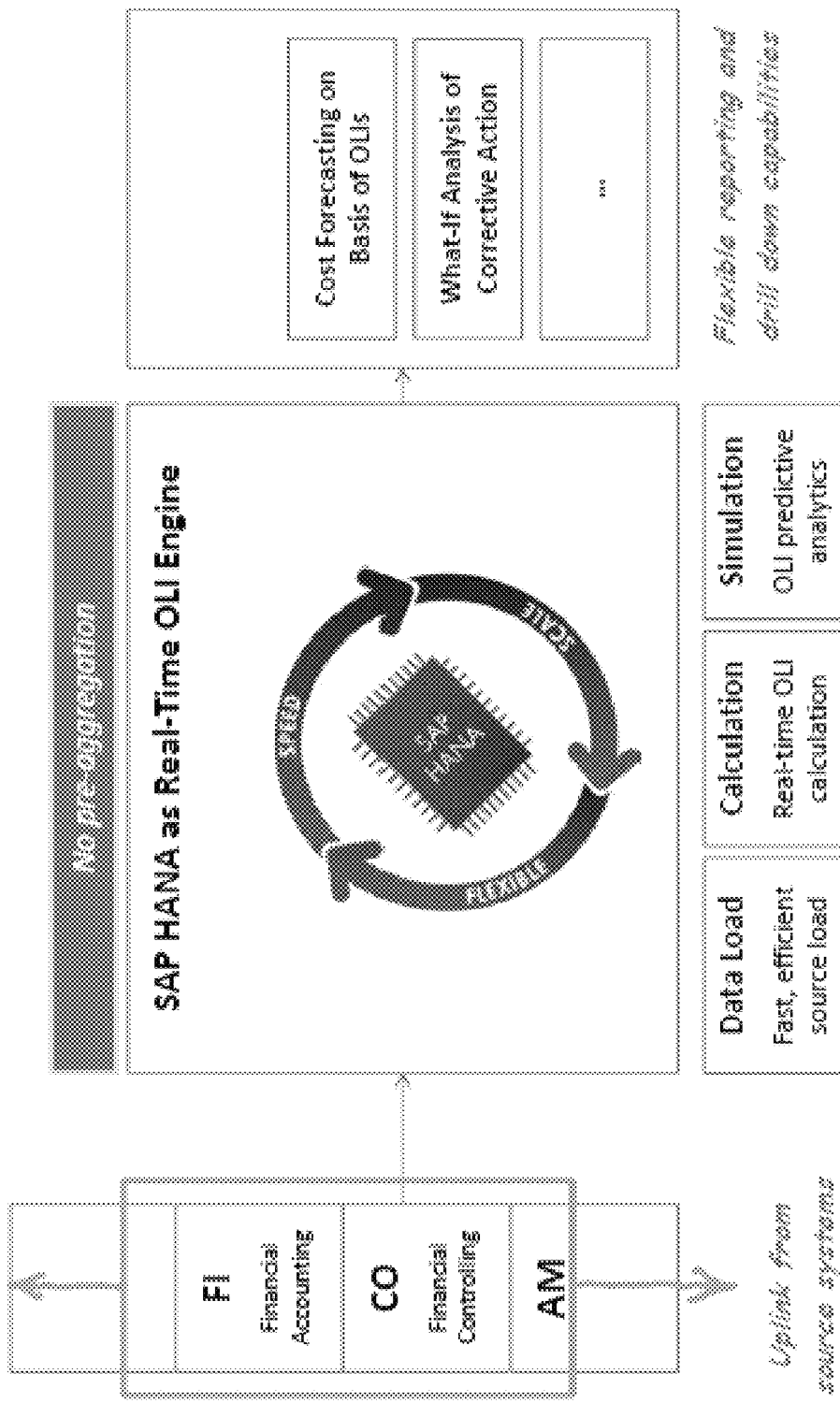
FIG. 4 is a general view illustrating OLI management as performed utilizing the HANA in-memory database.

Finally, OLIs may allow for corrective action to be implemented, and the ongoing measurement checked for variations in the underlying performance. FIG. 4 illustrates a process of OLI management as a continuous cycle performed on the basis of insights generated from the measurement and analysis of OLIs using the HANA in-memory database platform available from SAP AG. This FIG. 4 is discussed further below.

Of the four activities described above, OLI selection, measurement, and analysis are now discussed in more detail Implementation of corrective actions based on insights garnered from OLI monitoring, would depend upon the particular circumstances.

Approaches to OLI measurement may be based upon the data-intensive, rapid calculation of operational metrics and predictive analytics of operational efficiency afforded by in-memory computation. Such rapid analytics reduces the overhead traditionally associated with calculating performance and operational metrics in processes.

For example, conventional analytical processing generally calls for data to be presented in a specific format or structure. By contrast, in-memory data processing platforms can eliminate this step. As a result, calculations can be performed on source data without the need for artifacts such as indexes or materialized aggregates.

Such properties of in-memory database may be leveraged for OLI modelling as follows. One approach involves the analytical modelling of performance variables. Performance variables are variables that measure the output of processes. For example, the number of vendor invoices or the ratio of invoices to duplicate invoices processed by accounts payable can be used to model performance of a finance process.

Analytical modeling of operational variables may also be facilitated using in-memory databases. Operational variables are variables that measure basic activities and volumes in processes whose performance is being evaluated. In an example again taken from the finance context, operational variables may include the activities performed by accounts payable clerks in a finance department based on transactional records.

"What-if" simulation runs statistical methods such as linear regression on the data foundation previously developed, to determine the impact of process change on cost. Specifically, while the previous step defined the need for analytical models for performance and operational variables, in this next step, the analytical models for performance and operational variables may allow computation of "what-if" to determine correlations between performance and process change.

Embodiments allow predictive modelling of performance/factor correlation. Predictive modelling applies robust statistical methods to correlate operational metrics and performance. For example in a finance context this can include modelling correlation of invoices processed, with duplicates counted in accounts payable.

Embodiments may allow forecasting based on modification of process inputs. Cost forecasting is based on the output of predictive modelling and modelling of operational variables. In a finance context, this can include simulating the relative cost advantage of different processing strategies in accounts payable (AP).

Figure 2:
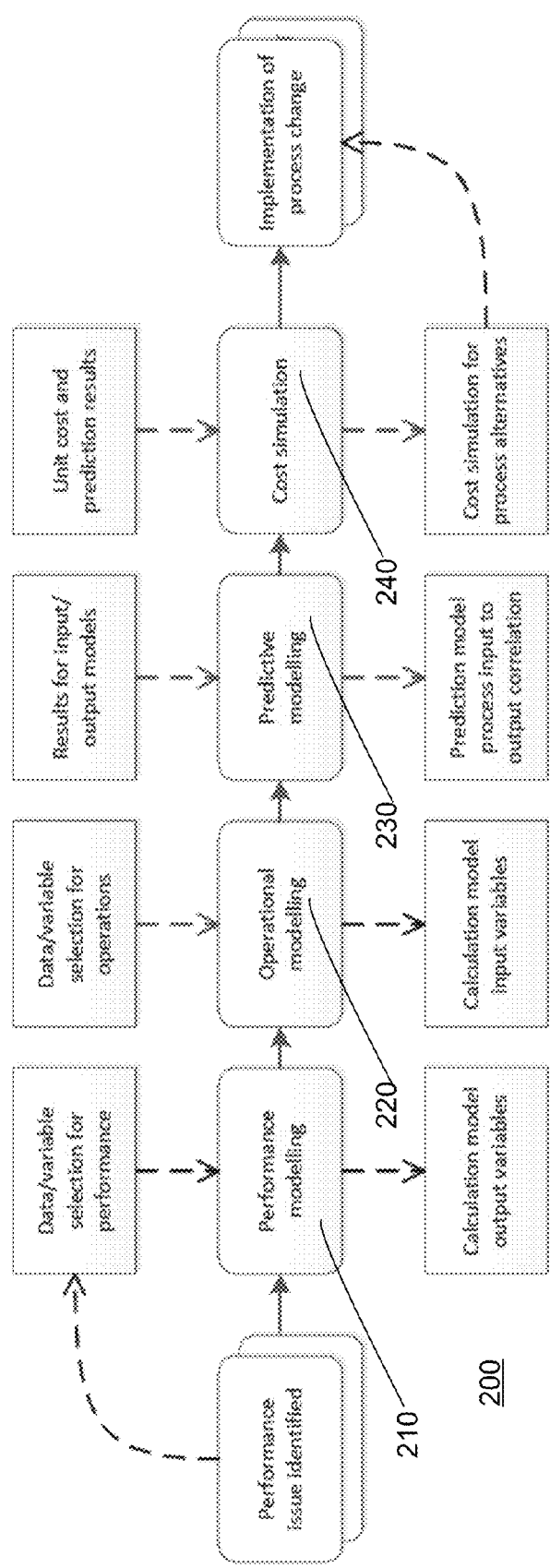
FIG. 2 is a flowchart showing different modelling steps and a flow of information.

FIG. 2 is a flowchart 200 showing different modelling steps and a flow of information between each step. The defining of operational objectives and performance issues (shown curved) may precede the steps shown in this figure. Similarly, outputs of the process can be used for reengineering (also shown curved).

One activity which may be employed to manage OLIs according to embodiments, is performance modeling 210, which may involve ratio calculation. The act of ratio calculation models the logic underlying the measurement of operational performance based on source transactional data from various (e.g. corporate) information systems. In one example the HANA in-memory database provides modelling capabilities such as attribute or calculation views, that can be used to perform complex aggregations and calculations on source transactional data.

In ratio calculation, these capabilities may be deployed to extract and aggregate data points that serve as measures of performance. An example in a finance context is a number of duplicate invoices in accounts payable, serving as a measure of procurement efficiency. The ratio is calculated by parsing accounting entries and checking for documents with similar attributes.

By themselves, ratios are not predictive in nature. Ratios are measures of output created by processes. These measures in the form of ratios, serve as inputs into predictive models developed in subsequent steps.

Another activity which may be employed to manage OLIs according to embodiments is operational modeling 220, which includes factor calculation. The act of factor calculation models variables in operational processes, and comprises one of two inputs to predictive modeling.

Factors represent variables in operational processes that a) can be measured, and b) can be acted upon to influence operational performance. In a finance example a number of manual invoices processed by accounts payable clerks is one factor that can be measured in transactional data, and that can be acted upon by increasing the percentage of spend under system control. Factors may be selected by performing a root cause analysis of performance issues (number of duplicate invoices), and relating root causes to specific activities or events (number of manual invoices) in operational processes.

Factors should be both measurable and sensitive. Factors are measurable to establish a foundation upon which correlation between a factor and a performance issue can be analyzed. Factors are sensitive to ensure changes applied to operational processes will result in a measurable change in performance able to be measured in the near-term.

Yet another activity which may be employed to manage OLIs according to embodiments, is predictive modeling 230. The act of predictive modelling uses the predictive capabilities of the in-memory database to correlate factors with operational performance and to predict cost.

Such correlation of factors with operational performance, provides a sound statistical foundation for the analysis of root causes and the definition of process change. For example in the finance context, correlating the number of manual invoices with the number of duplicate invoices processed by accounts payable allows establishing a statistical foundation based on which a more detailed process analysis can be performed. Based upon correlations, the impact of process changes on performance and ultimately cost associated with the OLI can be computed.

According to certain embodiments, linear regression may be used as one statistical method to establish correlation between factors and performance ratios. However, embodiments are not limited to this approach, and alternative methods for correlation and predictive analytics may include but are not limited to this.

Linear regression is a statistical method that models the relationship between a dependent variable Y and one or more explanatory variables $X_1, X_2, \ldots, X_n$. For example, in a finance context let Y be a measure of operational inefficiency such as the number of duplicate invoices.

Then, $X_1, X_2, \ldots, X_n$ is the set of variables (number of manual invoices, number of staff, etc.) influencing values for Y. Linear regression allows modeling the relationship between values for $X_1, X_2, \ldots, X_n$ and Y assuming a linear relationship between both.

Future values of a ratio (number of excess objects) may be forecast by using the coefficients for factors calculated on the basis of linear regression.

Thus in a finance environment, coefficients computed on the basis of multiple measurements of excess objects, objects created, and objects closed, may be applied to a number of objects created and closed provided by a system user. For example, a user may seek to test the impact of a decrease in the number of objects approved and created on the total number of excess objects to be expected.

Still another activity which may be employed to manage OLIs according to embodiments, is cost simulation 240. Cost simulation models a cost underlying volumes associated with an operational leading indicator.

Operational leading indicators measure movement or volumes in transactional data to produce an indication of performance. For example in the finance context a duplicate invoice indicator measures volumes of invoices that match the duplicate condition. As volumes are processed by work centers in the course of their work, they generate cost.

This cost can be estimated on the basis of actual time spent on handling volumes and the fully loaded cost of resources performing the associated tasks. For example, this may include invoice verification or dispute handling. Cost estimation commences with the identification of activities performed by one or more work centers relevant to an OLI.

It is noted that in addition to OLI selection, measurement, and analysis, further OLI management may be afforded by particular embodiments. For example, a composite index of multiple OLIs may be created.

Figure 3:
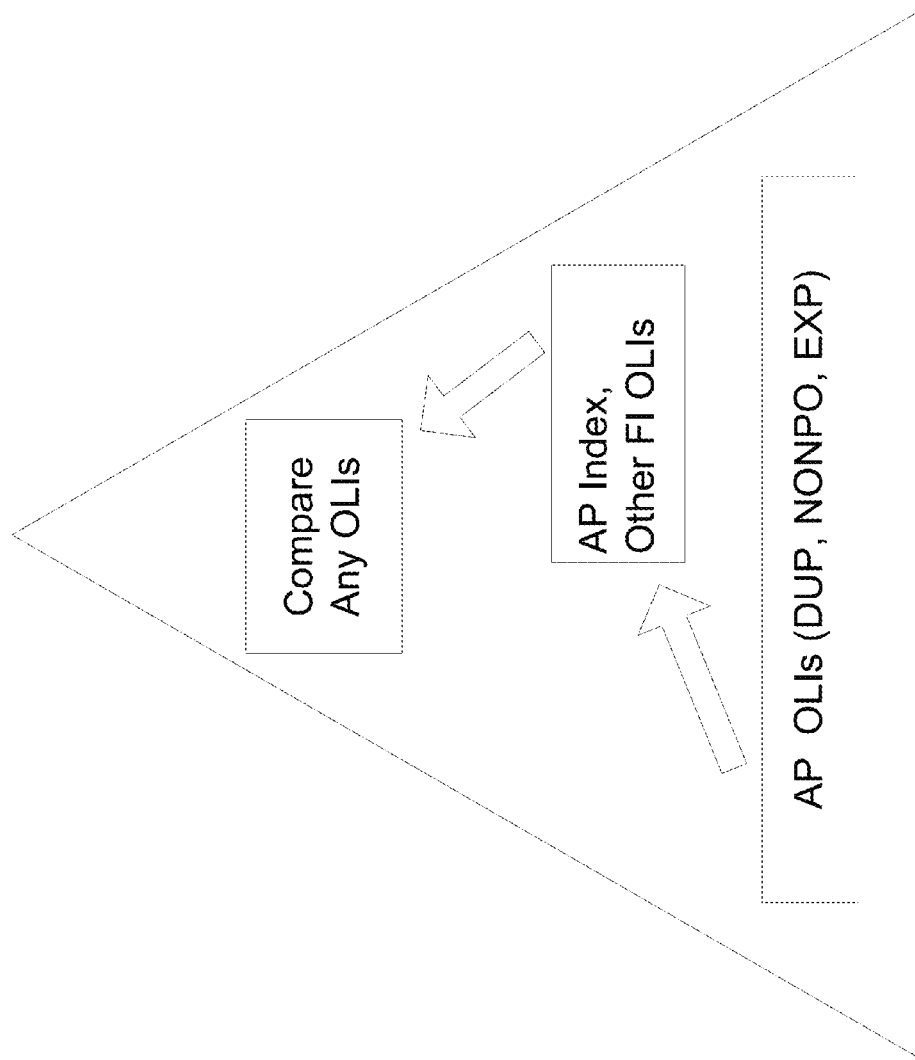
FIG. 3 shows an example where similar OLIs are merged into an index for the purpose of providing multiple audiences with different granularities, without losing focus of the end-user.

FIG. 3 shows an example where similar OLIs are merged into an index for the purpose of providing multiple audiences with different granularities, without losing focus of the end-user. Here, in the accounts payable (AP) function of a finance (FI) context, multiple related OLIs can include:
Duplicate Invoice Ratio (DUP);
Non-PO Invoice Ration (NONPO); and
Expired Invoice Ratio (EXP).

While a particular business function (e.g. Accounts Payable—AP) manager might be interested in knowing the status of all of those OLIs under his/her function, a manager situated one level higher may be satisfied with relying upon an AP composite index for effective monitoring of overall status of the AP function. Accordingly, FIG. 3 shows the further steps of creating such an AP index, and comparing OLIs.

It is noted that the in-memory database is not limited to being in any particular form or implementation. In-memory databases include but are not limited to the SYBASE IQ database available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

Another in-memory database is the HANA database available from SAP AG. The following examples illustrate deployment of the HANA database for managing OLIs in order to achieve cost savings in a finance (banking) environment.

FIG. 4 is a general view illustrating OLI management as performed utilizing the HANA in-memory database. In particular, data regarding Financial Accounting (FI), Financial Controlling (CO), and AM (Asset Management) may be received by the HANA database via uplink from various source systems. Then, without the need for pre-aggregation, HANA can load this data in order to function as a real-time OLI engine to perform calculation and simulation. Corresponding output from HANA available to users, may include cost forecasting on the basis of OLIs, and What If Analysis of corrective action.

The data acquisition and processing capabilities of HANA render it well-suited to function as a platform for OLI management. Two specific capabilities of the HANA platform are noted.

First, HANA eliminates the need of traditional data warehousing solutions for pre-aggregation, and instead operates directly on transactional data, for example as may be provided by the SAP Enterprise Resource Planning (ERP) system. This significantly reduces data volume and allows for on-the-fly computation of OLIs with full view of source data.

A second capability of HANA provides predictive analytics tools that are integrated in the database server. This allows for the implementation of complex "what-if" scenarios without the overhead and latency incurred by a separate and distinct application server.

Regarding OLI measurement and use of OLIs as a business transformation tool, the SAP HANA in-memory database facilitates OLI measurement by operating on raw transactional data without pre-aggregation, eliminating much of the costly overhead of traditional data warehouse solutions. A comprehensive set of data load and transformation tools complement the HANA platform to integrate data in transactional systems.

The SAP HANA in-memory database also provides a comprehensive set of statistical and predictive analytics tools (such as regression analysis) that can be used to build powerful simulation capabilities; for example to perform What-If Simulation. Because these statistical and predictive analytics tools are integrated into the HANA platform, computation and data retrieval run in the same physical environment, dramatically increasing throughput and speed of computation.

In an initial phase of this (finance) example, OLIs at a commercial bank were sampled from finance based upon the four (4) criteria of being: •measurable, •actionable, •predictive, and •sensitive.

Each of these criteria is now discussed below.

An OLI is measurable on the basis of data that are accessible and of good quality. Such measurability is reflected in the ratio of duplicate invoices to total invoices, for example.

An OLI is actionable if insights generated from the OLI lead to corrective action on process performance. For example, an unfavorable change in a duplicate invoice ratio indicates that the underlying purchasing and/or accounts payable processes merit attention.

An OLI is predictive where a change in OLI values precedes the occurrence of certain events. For example, an increase in a duplicate invoice ratio suggests undesirable costs associated with full-time employees (FTEs) for correcting the errors, lost interest, and so forth in the future.

An OLI is sensitive if it is able to react to small changes occurring in short time, as opposed to large changes taking place over longer periods. In other words, corrective action applied to underlying processes must lead to impact that is reflected in changes in OLI performance in the near-term.

Selection of OLI candidates was justified on the basis of their impact on cost performance. In a selection process, over fifty-two (52) OLI candidates were initially evaluated based on feedback from the finance department. These candidate OLIs largely covered the areas of data acquisition in finance, product control, cost management, and accounts payable.

Based upon further expert interviews, data provided from financial systems, and the four selection criteria just mentioned, ten (10) OLIs were focused on for further examination. Those ten OLIs satisfied the criteria of a) leading to direct and near-term corrective action, and b) being measurable in the data provided.

Table 1 summarizes the ten OLIs identified and defined on the basis of expert interviews and data sampled.

| Category | OLI | Description | Justification |
|---|---|---|---|
| General Ledger | 1 | Number of Inactive master data objects | Drives cost of master data maintenance and related hierarchies |
|  | 2 | Number of Manual Adjustments | Drives manual reconciliation and correction cost in financials |
| Accounts Payable | 3 | Duplicate Invoice Ratio | Drives cost of correction, resolution of blocked invoices, and lost interest |
|  | 4 | Non-PO invoice ratio | Drives cost of invoice verification, approvals, once-off vendor maintenance |
|  | 5 | Invoices paid with expired discount | Drives opportunity cost of lost interest and actual cost of lost cash discount |
| Travel Management | 6 | Percent travel over policy limits | Drives cost of non-compliance such as missed volume discounts and targets |
|  | 7 | Number of T&E data errors | Drives cost of manual correction of receipts and tax codes for overseas travel |
| Human Resources | 8 | Number of HR data mismatches | Drives cost of manual feeds into HR systems and manual enrichment |
|  | 9 | Number of HR data changes | Drives cost of verification and manual correction of HR records |
| Asset Accounting | 10 | Asset consumed/FTE | Drives cost of asset maintenance and tracking of asset consumption by staff |

In a final set, three (3) OLIs were selected for implementation as HANA models for measurement and predictive analytics. Each OLI was sampled based on the process described above and implementation of the OLI concept relied on data sampled and provided to use from financials and HR systems of the bank.

Example 1: Ratio Calculation/Number of Inactive Master Data Objects as OLI

Item #1 of Table 1 indicates a number of inactive master data objects as one possible OLI. This OLI drives cost of master data maintenance and related hierarchies.

Various aspects of OLI modeling according to embodiments, are now illustrated in connection with this particular example. One aspect of OLI modeling is ratio calculation.

Consider the following example of a ratio: a number of excess control points in financial accounting measures efforts associated with the creation and maintenance of finance objects in the accounting hierarchy. For example, this includes objects such as company codes, profit centers, or cost centers and associated governance and controlling activities.

A definition of what constitutes "excess" objects per the above example, may be driven by three distinct conditions against which objects are evaluated.

"Not locked" describes a condition in which an object has not been blocked for posting of actuals, (e.g. using lock indicators on master data records in the Enterprise Resource Planning (ERP) system available from SAP AG).

"Dormant" describes a condition in which an object has had no or low volumes of financial activity over the course of one or multiple posting periods spanning one or many financial years.

"Immaterial balance" describes a condition in which the absolute balance of an object over a defined number of posting periods, falls below a threshold amount considered to be material.

Conditions can be inclusive or mutually exclusive, depending on the use case. In this particular example, the not locked condition is inclusive, whereas dormant and materiality conditions are exclusive. Dormant control point objects may have material balances and vice versa.

Table 2 summarizes the inputs, outputs, and methods of calculation used for ratio calculation across three different object types in the finance use case.

| Model | Input | Output | Method of calculation |
|---|---|---|---|
| Excess company codes | Accounting and master data tables from SAP ERP | Number of excess objects in data satisfying dormant and materiality conditions | Read accounting documents posted to company code to extract movement and balance |
| Excess profit centers | Accounting and master data tables from SAP ERP | Number of excess objects in data satisfying dormant and materiality conditions | Read total tables for profit center to extract movement and balance |
| Excess Cost Centers | Accounting and master data tables from SAP ERP | Number of excess objects in data satisfying dormant and materiality conditions | Read total tables for cost center to extract movement and balance |

Ratio calculation thus comprises three models, i.e., one model for each object class. Models consume master and transactional data from the SAP ERP Financials module as data foundation for analytics and calculation. For example, profit center information is extracted from the master tables, totals tables, and line item tables for profit center accounting in SAP ERP.

This information is then used to compute the number of excess objects by applying the conditions defined above. This includes the definition of dormant and immaterial balance per the following of Table 3:

| Model | Dormant Condition Where: | Immaterial Balance Condition Where: |
|---|---|---|
| Excess company codes | object has not been locked; and accounting document count for last 12 periods = 0 | Total balance of accounting documents in last 12 posting periods ≤ GBP 500,000 |
| Excess profit centers | object has not been locked; and accounting document count for last 12 periods = 0 | Total balance including cost, revenue, and balance sheet in ast 12 posting periods ≤ GBP 250,000 |
| Excess Cost Centers | object has not been locked for actuals; and accounting document count for last 12 periods = 0 | Total balance for internal and external postings in last 12 periods ≤ GBP 50,000 |

Figure 5A:
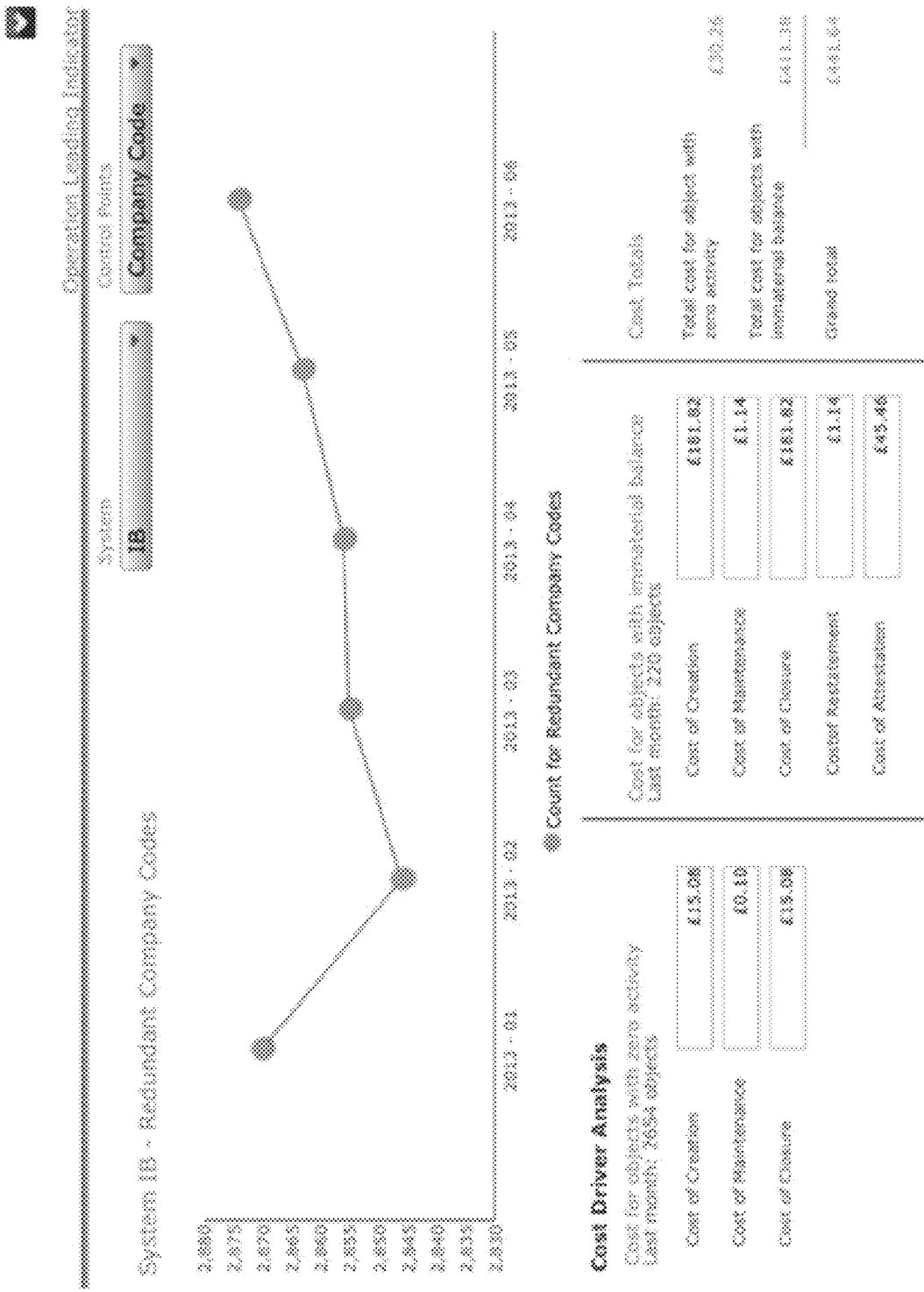
FIG. 5A illustrates an example a user interface including a screen shot.

FIG. 5A illustrates an example of a user interface plotting redundant company codes over time. The screen shot of FIG. 5A also shows cost driver analysis and the cost totals.

Figure 5B:
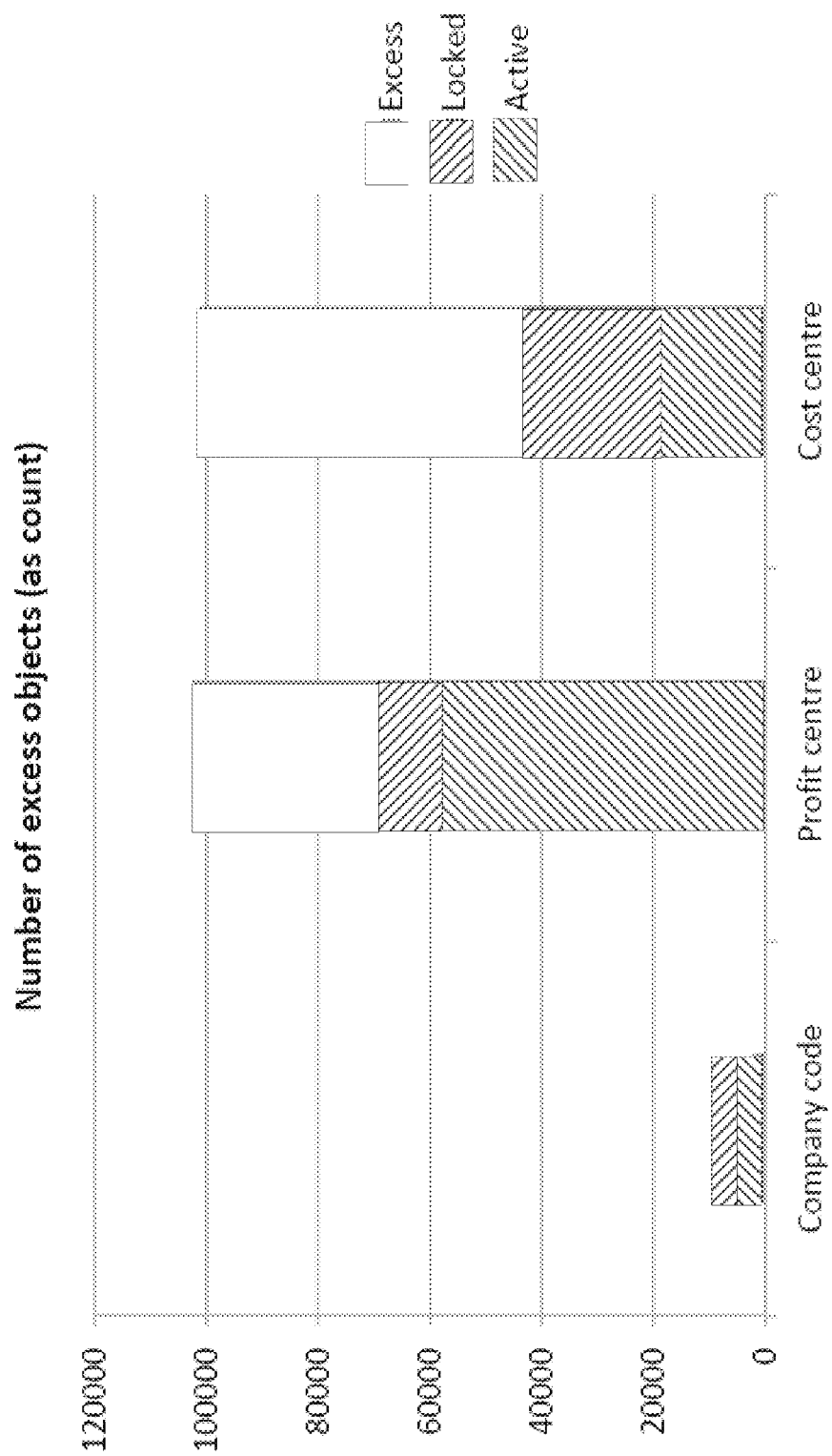
FIG. 5B illustrates results of one example of a finance use case.

FIG. 5B illustrates the output of running ratio calculation models on finance data extracted from the finance use case. The example shown in FIG. 5B illustrates outcomes for the corporate, wealth, and investment divisions alone. Measurements are broken up into numbers for excess objects, locked objects, and active objects following the definition introduced above for comparison.

This example reveals a mismatch between the number of profit and cost centers. It also reveals an overly high number of excess cost center control points in the finance hierarchy for the divisions.

Example 2: Duplicate Invoice as OLI

The OLI listed as item #3 in Table 1, comprises Duplicate Invoices. This example measured a ratio of duplicate invoices to total invoices received by a business unit in the area of accounts payable. Reasons for receiving duplicate invoices can be manifold, and can include but are not limited to: slow payment processes (vendor issues invoices more than once), a lack of consistent handling of documents (e.g., where paper invoices are still in use with vendors), a lack of consistent purchase order processing (e.g., where invoices are not linked to purchase orders), staff turnover (as a result of lost information), or fraud. Definition, data points, cost drivers, and benefits associated with the Duplicate Invoice OLI are now discussed.

The Duplicate Invoice OLI is defined as the ratio of a number of duplicate invoices received from vendors, divided by the total number of invoices received. Duplicate invoices are defined as any two invoices received by a purchase ledger clerk for which the attributes vendor, company code, currency, documents reference number, and invoice date, are identical.

Each instance of duplicate invoices in transactional data identified as meeting this definition, is counted and then the total count is divided by the total invoices. The ratio thus reveals the manual overhead for accounts payable.

$$\text{Duplicate invoice ratio} = \frac{\text{Number of duplicate invoices}}{\text{Total number of invoices}}$$

Data points for this Duplicate Invoice OLI are now described. The General Ledger (G/L) component in the Financial Accounting (FI) module of the Enterprise Resource Planning (ERP) platform of SAP AG, contains the relevant data points for indicator calculation. The following data points are required for computing the duplicate invoice ratio.

First, the accounting document header table (BKPF) of the G/L comprises information regarding the company code and document type (vendor document, vendor invoice, etc.). Second, the accounting document header and segment tables (BKPF, BSEG) comprise information regarding the issuing vendor, the currency, reference number, and date of the invoice.

Cost drivers of the Duplicate Invoice OLI are now described. Five cost drivers are commonly associated with the handling of duplicate invoices. A first cost is associated with efforts to correct the invoice, such as negotiation with the vendor. A second cost of block resolution covers the additional cost incurred as a result of manual reviews of blocked invoices by managers and/or accounts payable clerks. Third and fourth costs relate to duplicate invoices that were paid (incurring costs associated with payment) and the opportunity cost of interest lost by duplicate payment. The fifth and final driver associated with duplicate invoices is the cost of recovering payment.

Expected possible benefits associated with the Duplicate Invoice OLI are now described. The duplicate invoice indicator provides quantifiable evidence for weaknesses in procurement and accounts payable processes that lead to higher than average cost. For example, an excessive amount of duplicate invoices in a certain business unit may point to faulty process controls (vendor invoice not checked against original purchase orders) or insufficient training of staff (missing directives, non-standardized processes).

Another possible benefit is the ability to drill from group-level ratio down to business unit ratios. This allows for the comparative analysis and benchmarking of business unit performance.

Example 3: Number of Invoices w/Expired Discount as OLI

This example measures the number of invoices paid with expired discounts (item #5 in Table 1). This OLI gives an indication of effective accounts payable management.

In particular, contracts with vendors generally include payment terms. If payments are made before a cut-off date, the buyer may be eligible for a discount.

Multiple reasons can lead to payments missing the cut-off. First, payments may be delayed as a result of delays in accounts payable or payment approval processes. Second, errors such as duplicate invoices, payment with standard terms, or missing reference data may also lead to delays.

This OLI is defined to measure the number of invoices paid by each company, where the invoice was paid outside discounts negotiated with vendors. Payments released for processing are handled by the SAP ERP payment engine in the AP component, which records lost cash discounts in the local and invoice currency. The count of payments with lost cash discounts can therefore be used as a proxy measure.

This OLI is thus defined as the sum of all payments processed by the payment engine for which lost cash discounts were recorded, as documented in the formula below.

$$\text{Invoices with expired discount} = \Sigma \text{payments with lost cash discount}$$

Data points for this OLI are as follows. The calculation of the indicator uses payment settlement data as a proxy for invoices paid with expired discounts. Only one data point is required to determine the lost cash discount for a given payment.

In SAP ERP, invoices released for payment are transferred to the payment module of FI. They are then wired into vendor accounts using one of the configured payment methods.

As a result, payment settlement data (REGUH) provides a complete record of payments. Next to payment details, the payment module records lost cash discounts in both the local and transacting currency.

Cost drivers for invoices with expired discounts include the opportunity cost of lost interest from early payment, and the amount lost as a result of the expired discount. First, if payment had been made within the negotiated time interval, the company could have used the discount from the vendor as additional working capital. This is a hypothetical scenario and therefore is included under the category of opportunity cost.

Second, the premium paid for not paying within the discount interval is the actual amount paid minus the discounted amount negotiated with the vendor.

Expected benefits of utilizing this OLI are as follows. Monitoring the number of invoices with expired discounts brings attention to weaknesses in accounts payable management. For example, payments may be delayed as a result of staff shortages in the accounts payable department.

Similarly, payments may be scheduled using the standard terms of a company rather than those negotiated with the vendor. In any case, monitoring the indicator reveals the opportunity cost of not paying invoices within cut-off times. However, there is a trade-off for early payment if invoices are paid using funds that were otherwise allocated.

Figure 6:
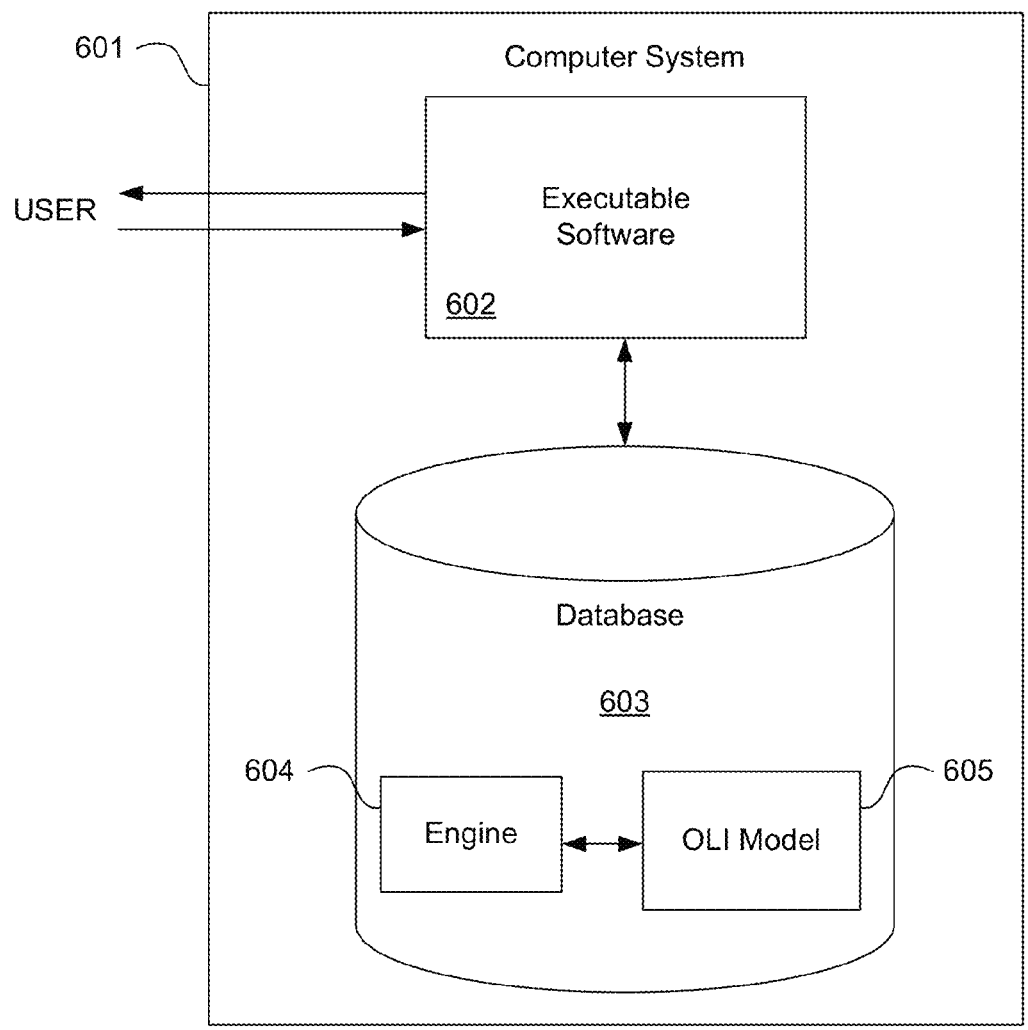
FIG. 6 illustrates hardware of a special purpose computing machine configured to provide OLI management.

FIG. 6 illustrates hardware of a special purpose computing machine configured to perform OLI management according to an embodiment. In particular, computer system 601 comprises a processor storing executable software 602 that is in electronic communication with a non-transitory computer-readable storage medium 603. This computer-readable storage medium has stored thereon code 605 corresponding to an OLI model. Code 604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In conclusion, embodiments according to embodiments may be expected to offer one or more benefits. OLI templates deliver a standard approach to compute operational leading indicators on the basis of structured information. Enterprise Resource Planning (ERP) systems deliver efficiency gains by defining standard processes in a wide range of functional areas including finance. This has the benefit of providing structured information on activities of an organization that can be mined and analyzed. For example, standard processes in accounts payable or financial controlling deliver an accurate picture of transactions and can be used to measure operational efficiency in the finance department of a firm. OLIs define a starting point for more effective process control.

Various embodiments of OLI measurement can provide one or more of the following benefits to process analysts and responsible managers in the case site. One potential benefit is the ability to perform rapid analytics of operational efficiency based on in-memory processing.

Specifically, in-memory processing of structured data eliminates the overhead associated with analytical processing in traditional warehouse environments. This can lead to a more favorable ratio between the cost to achieve OLI measurement and returns generated by the continuous monitoring of performance.

Another possible benefit is simulation of sunk and recurring cost incurred as a result of operational issues. In particular, cost simulation allows decision makers to drill down and compare costs between departments and work centers.

Still another possible benefit offered by particular embodiments is the use of What-if Simulation of alternative approaches to eliminating operational issues. What-if Simulation delivers a statistically grounded approach to simulating the impact of change strategies on operational performance. More robust predictive modelling can help to increase its accuracy.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
extracting performance data of a process from a data object of an application to an in-memory database of a computer system, wherein the performance data is extracted to the in-memory database in real time from unmodified source data without preaggregation;
storing the performance data in the in-memory database;
performing statistical analysis on the performance data to generate a model of at least one operational leading indicator (OLI) of the process, the model comprising calculation of a ratio without an index artifact, the ratio evaluating a first condition comprising a lock indicator of the data object in the application, and a second condition evaluating a threshold absolute balance of the data object over a defined number of posting periods, wherein the statistical analysis is performed using in-memory computing directly on the performance data stored in the in-memory database without requiring separate computer hardware;
storing the model of the OLI in the in-memory database;
causing an in-memory database engine in communication with the model to receive inputs for performance values and performance measures of the process;
causing the in-memory database engine to process an output of the statistical analysis of the model in order to produce a cost measure;
performing, by the computer system, ongoing measurements of operational performance of the process from the output of the statistical analysis of the model;
determining, by the computer system, variations in the operational performance of the process in response to the ongoing measurements; and
implementing, by the computer system, corrective action based on the variations in the operational performance of the process.

2. A method as in claim 1 wherein the in-memory database engine conducts predictive modeling correlating a measure of process inefficiency with the performance data to predict the cost measure.

3. A method as in claim 2 wherein the in-memory database engine further conducts operational modeling identifying variables affecting the process.

4. A method as in claim 1 further comprising causing the in-memory database engine to perform a what-if simulation based upon a new value for performance factors specified by a user.

5. A method as in claim 1 further comprising causing the in-memory database engine to merge the model of the OLI with a model of a related OLI in order to create a composite index.

6. A method as in claim 1 wherein the statistical analysis comprises linear regression.

7. A non-transitory computer readable storage medium embodying a computer program for performing a method, said method comprising:
extracting performance data of a process from a data object of an application to an in-memory database of a computer system, wherein the performance data is extracted to the in-memory database in real time from unmodified source data without preaggregation;
storing the performance data in the in-memory database;
performing statistical analysis on the performance data to generate a model of at least one operational leading indicator (OLI) of the process, the model comprising calculation of a ratio without an index artifact, the ratio evaluating a first condition comprising a lock indicator of the data object in the application, and a second condition evaluating a threshold absolute balance of the data object over a defined number of posting periods, wherein the statistical analysis is performed using in-memory computing directly on the performance data stored in the in-memory database without requiring separate computer hardware;
storing the model of the OLI in the in-memory database;
causing an in-memory database engine in communication with the model to receive inputs for performance values and performance measures of the process;
causing the in-memory database engine to process an output of the statistical analysis of the model in order to produce a cost measure;
performing, by the computer system, ongoing measurements of operational performance of the process from the output of the statistical analysis of the model;
determining, by the computer system, variations in the operational performance of the process in response to the ongoing measurements; and
implementing, by the computer system, corrective action based on the variations in the operational performance of the process.

8. A non-transitory computer readable storage medium as in claim 7 wherein the in-memory database engine conducts predictive modeling correlating a measure of process inefficiency with the performance data to predict the cost measure.

9. A non-transitory computer readable storage medium as in claim 8 wherein the in-memory database engine further conducts operational modeling identifying variables affecting the process.

10. A non-transitory computer readable storage medium as in claim 7 wherein the method further comprises causing the in-memory database engine to perform a what-if simulation based upon a new value for performance factors specified by a user.

11. A non-transitory computer readable storage medium as in claim 7 wherein the method further comprises causing the in-memory database engine to merge the model of the OLI with a model of a related OLI in order to create a composite index.

12. A non-transitory computer readable storage medium as in claim 7 wherein the statistical analysis comprises linear regression.

13. A computer system comprising:
one or more processors;
a software program, executable on said computer system, the software program configured to:
extract performance data of a process from a data object of an application to an in-memory database of the computer system, wherein the performance data is extracted to the in-memory database in real time from unmodified source data without preaggregation;
store the performance data in the in-memory database;
perform statistical analysis on the performance data to generate a model of at least one operational leading indicator (OLI) of the process, the model comprising calculation of a ratio without an index artifact, the ratio evaluating a first condition comprising a lock indicator of the data object in the application, and a second condition evaluating a threshold absolute balance of the data object over a defined number of posting periods, wherein the statistical analysis is performed using in-memory computing directly on the performance data stored in the in-memory database without requiring separate computer hardware;
store the model of the OLI in the in-memory database;
cause an in-memory database engine in communication with the model to receive inputs for performance values and performance measures of the process;
cause the in-memory database engine to process an output of the statistical analysis of the model in order to produce a cost measure;
performing ongoing measurements of operational performance of the process from the output of the statistical analysis of the model;
determining variations in the operational performance of the process in response to the ongoing measurements; and
implementing corrective action based on the variations in the operational performance of the process.

14. A computer system as in claim 13 wherein the in-memory database engine conducts predictive modeling correlating a measure of process inefficiency with the performance data to predict the cost measure.

15. A computer system as in claim 14 wherein the in-memory database engine is caused to further conduct operational modeling identifying variables affecting the process.

16. A computer system as in claim 13 wherein the software program is further configured to cause the in-memory database engine to perform a what-if simulation based upon a new value for performance factors specified by a user.

17. A computer system as in claim 13 wherein the software program is further configured to cause the in-memory database engine to merge the model of the OLI with a model of a related OLI in order to create a composite index.

* * * * *